(12) United States Patent
Venolia

(10) Patent No.: US 7,454,716 B2
(45) Date of Patent: Nov. 18, 2008

(54) CLUSTERING MESSAGES

(75) Inventor: Gina D. Venolia, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 762 days.

(21) Appl. No.: 10/743,601

(22) Filed: Dec. 22, 2003

(65) Prior Publication Data

US 2005/0138552 A1 Jun. 23, 2005

(51) Int. Cl.
*G06F 3/048* (2006.01)
*G06F 3/03* (2006.01)

(52) U.S. Cl. .............. 715/853; 715/810; 715/854; 715/855; 707/3; 707/10; 709/204; 709/228

(58) Field of Classification Search ............ 715/810
See application file for complete search history.

(56) References Cited

U.S. PATENT DOCUMENTS

| | | | | | |
|---|---|---|---|---|---|
| 5,848,058 | A | * | 12/1998 | Ooyoshi et al. | 370/244 |
| 6,057,841 | A | * | 5/2000 | Thurlow et al. | 715/809 |
| 6,351,764 | B1 | * | 2/2002 | Voticky et al. | 709/207 |
| 6,704,772 | B1 | * | 3/2004 | Ahmed et al. | 709/207 |
| 6,725,228 | B1 | * | 4/2004 | Clark et al. | 707/102 |
| 6,832,244 | B1 | * | 12/2004 | Raghunandan | 709/206 |
| 7,072,942 | B1 | * | 7/2006 | Maller | 709/206 |
| 7,139,800 | B2 | * | 11/2006 | Bellotti et al. | 709/206 |
| 2002/0087646 | A1 | * | 7/2002 | Hickey et al. | 709/206 |
| 2002/0147777 | A1 | * | 10/2002 | Hackbarth et al. | 709/205 |
| 2003/0154212 | A1 | * | 8/2003 | Schirmer et al. | 707/103 R |
| 2004/0015548 | A1 | * | 1/2004 | Lee | 709/204 |
| 2004/0021686 | A1 | * | 2/2004 | Barberis | 345/738 |
| 2004/0044735 | A1 | * | 3/2004 | Hoblit | 709/206 |
| 2004/0054737 | A1 | * | 3/2004 | Daniell | 709/206 |
| 2004/0088359 | A1 | * | 5/2004 | Simpson | 709/206 |
| 2004/0122683 | A1 | * | 6/2004 | Grossman et al. | 705/1 |
| 2004/0201668 | A1 | * | 10/2004 | Matsubara et al. | 348/14.05 |
| 2005/0068167 | A1 | * | 3/2005 | Boyer et al. | 340/531 |
| 2005/0071428 | A1 | * | 3/2005 | Khakoo et al. | 709/204 |
| 2005/0114871 | A1 | * | 5/2005 | Wolff et al. | 719/331 |

* cited by examiner

*Primary Examiner*—Weilun Lo
*Assistant Examiner*—Steven B Theriault
(74) *Attorney, Agent, or Firm*—Amin, Turocy & Calvin, LLP

(57) ABSTRACT

The subject invention provides for systems and methods that improve visualization of messages in a user's inbox. The systems and methods cluster messages into four groups: unaccessed, unaccessed and pending; pending; and read. This allows a user to more efficiently handle large volumes of messages in a prioritized way. Additionally, it supports a seamless flow between triage of new messages, management of recently received messages, and retrieval of recent as well as older messages for the user. Messages can include conversations between a user and one or more contacts, email (electronic mail) messages, voice messages, images, documents, tasks, as well as other forms of media. In one aspect of the invention, messages can be organized and/or prioritized into any of at least four clusters, whereby the four clusters appear in the order of unaccessed, unaccessed and pending, pending, and accessed.

42 Claims, 7 Drawing Sheets

CLUSTERING MESSAGES

TECHNICAL FIELD

This invention is related to systems and methods that facilitate organizing content and in particular, that relate to organizing content such as messages, documents, and media into at least one distinct cluster to optimize involvement and interaction with such content.

BACKGROUND OF THE INVENTION

The advent of global communications networks such as the Internet has provided alternative forms of communicating worldwide. Additionally, it has increased the speed at which communications can be sent and received. Not only can written or verbal messages be passed through the Internet, but documents, sound recordings, movies, and pictures can be transmitted by way of the Internet as well. As can be imagined, inboxes are being inundated with countless items. The large volume can more than difficult to manage and/or organize for most users.

In particular, a few of the more common activities that a user performs with respect to email, for example, are: sorting of new messages, task management of using messages that can serve as reminders, and retrieval of past messages. Retrieval of recent messages can be more common than older messages. Traditional systems employed today support at least some aspect of these three activities using folders such as an inbox, task-oriented folders, and user-created folders, respectively. However, this as well as other existing approaches present several problems. The folders make stark divisions between the three activities which are not conducive or coincident with user behavior, in general. For example, tasks are not visible to the user, or rather are "out of sight, out of mind", and thus can be easily, if not frequently, neglected, overlooked, or forgotten. In addition, in many current systems any given message can only be in one folder at a time. Hence, the particular message cannot serve multiple activities at once. Other current systems have attempted to ease these problems, however, they fall short as well for similar reasons.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods that improve visualization of messages in a user's inbox or message store. More specifically, the systems and methods cluster messages into at least one of four groups: unaccessed, unaccessed and pending; pending; and read. This allows a user to more efficiently handle large volumes of messages in a prioritized way. Additionally, it supports a seamless flow between triage of new messages, management of recently received messages, and retrieval of recent as well as older messages by the user. Messages can include conversations between a user and one or more contacts, email (electronic mail) messages, voice messages, images, documents, tasks, as well as other forms of media.

According to one aspect of the invention, messages can be organized and/or prioritized into at least one of at least four clusters, whereby the four clusters can be viewed in a hierarchal order of unaccessed, unaccessed and pending, pending, and accessed. The ordering of the clusters can be significant. The unaccessed cluster corresponding to unaccessed content can be placed first to support a user's initial activity when accessing messages: triage. The pending cluster can be placed third because keeping reminders of pending actions close at hand mitigates the "out of sight, out of mind" problem.

The unaccessed and pending cluster can be placed second and in between the unaccessed and the pending because it is logically part of both. For example, an unaccessed or unopened message may have a "due date" associated therewith that is apparent to the user or associated with the message without needing to open or read the message. Thus, those messages can be placed in this second cluster. Finally, the accessed section can be placed fourth or last because it is potentially the largest grouping and with the least amount of demand.

According to another aspect of the invention, messages within any one of the clusters can be organized based at least in part upon some kind of priority. This priority can be the result of explicit user configuration or input by senders (e.g., authors, originator of message, etc.) and/or trained filtering systems that can learn and automatically route messages based on such learning. For example, highest priority messages can appear at the top of a respective cluster. In addition, such messages can include one or more visual indicators for quick identification as a highest priority message.

According to yet another aspect of the invention, messages can be further partitioned within a cluster based at least in part upon a group of people involved in the messages. Imagine in a work or home setting, people can be associated with one more sub-groupings. At work, for instance, a group of three people working on the same project may receive messages from one another or from their supervisor. Because these messages may be related, they can be arranged together. Thus, messages involving the group (e.g., inclusion of at least one group member in a "To:" field) can cause an email to be routed to one or more specific clusters and then prioritized accordingly. In general, messages can be ranked or ordered within each cluster according to one or more of the following user preferences: priority, utility, cost, author, genre, time criticality, age, context, size, user state, account through which message was received, type of message, and/or rendering device.

According to still another aspect of the present invention, each cluster can have sub-groupings or varying state levels within each cluster. For example, the pending cluster can have sub-groups entitled pending—to be accessed, —need to respond, —action required and—delegated. Alternatively or in addition, messages or items in the pending cluster and/or in one of the sub-groupings can be sorted by due date, by level of importance, by author, and/or any of the other ranking preferences as mentioned above.

According to still yet another aspect, headers can be employed to visually divide the clusters and readily identify them to the user. Furthermore, different background colors or shading can be utilized to differentiate between clusters or sub-groupings within clusters. Finally, the clusters can be preset by the system or can be modified based in part upon user preferences.

It should be appreciated that the present invention as described can be applied to the management and organization of messages as previously defined above as well as other applications such as when a user is attempting to multi-task between more than one real-time communications channel. Thus, the invention can facilitate managing and organizing according to priority, for example, an open telephone conversation, an open video conference or a live meeting with or without a whiteboard, a chat conversation, and/or an instant messaging conversation. Once again, the invention can rank and organize the respective communication channels with respect to parties involved (e.g., party or parties on the other end), type of communication in terms of stability and bandwidth required (e.g., video conferencing can require more hardware and/or software resources whereas a chat conversation may not), in addition to the other ranking preferences previously mentioned.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
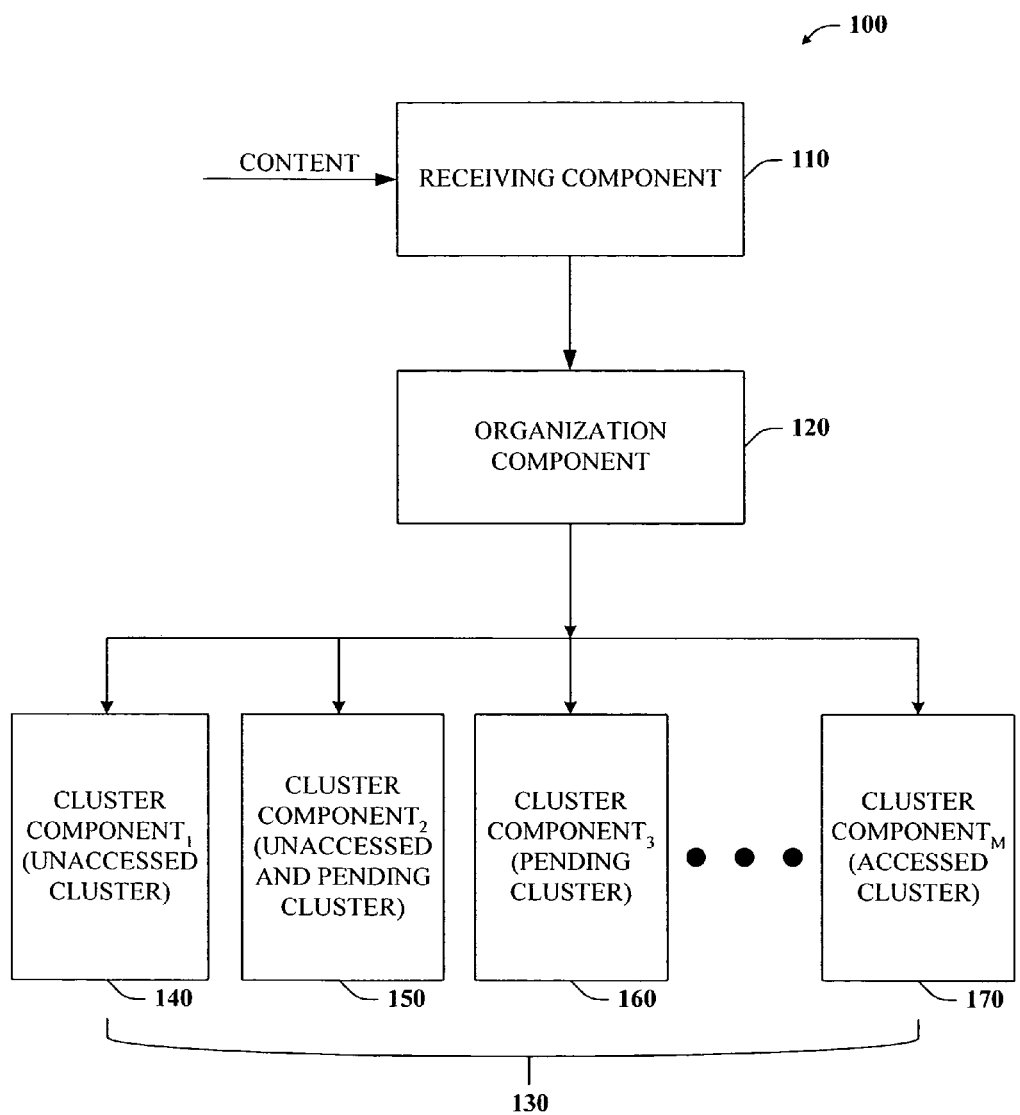
FIG. 1 is a high-level block diagram of a system that facilitates organizing and viewing messages in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with automatically organizing content into one or more clusters. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, there is illustrated a high-level block diagram of a system 100 that facilitates management of content. In particular, the system 100 comprises a receiving component 110 that can receive content such as one or more messages. Examples of content or messages include but are not limited to conversations, email, documents, tasks, images, media, and the like. As the content is received, it can be communicated to an organization component 120 which is operatively connected to the receiving component 110.

The organization component 120 can partition and make at least a portion of the content available to at least one or more cluster components 130 such as a CLUSTER COMPONENT$_1$ (e.g., unaccessed cluster) 140, CLUSTER COMPONENT$_2$ (e.g., unaccessed and pending cluster) 150, CLUSTER COMPONENT$_3$ (e.g., pending cluster) 160, and a CLUSTER COMPONENT$_M$ (e.g., accessed cluster) 170. In practice, imagine a user receives a plurality of messages and in particular, a first message and a second message. The plurality of messages can be received by the receiving component 110 and then communicated to an organization component 120 whereby they can be routed to at least one of the four clusters.

Initially, for example, at least the first message can be routed to the unaccessed cluster 140 via the organization component 120. From there, the first message can be re-routed or moved again to any one or more of the other clusters. For example, the first message can be moved to the pending cluster 160 after the user accesses the message from the unaccessed cluster 140. Such movement can occur by explicit user action. Alternatively, the message can be automatically routed to the accessed cluster 170 as soon as it is opened from the unaccessed cluster 140 to indicate that the message has been opened and/or read. From the accessed cluster 170, the user can determine if the message requires further attention and if so, to which cluster the message should be moved. Thus, by clustering content into at least one of the four clusters and then presenting it as a function of the respective clusters, a user's experience with managing their content can be improved.

To further facilitate and/or improve viewing of the content within their respective clusters, the clusters can be visually differentiated according to their background color. Additionally, the clusters can include headers or a title bar bearing the name of the respective cluster.

It should be appreciated that any content can be included in one or more clusters. For example, a message and a copy thereof can be listed in both (1) unaccessed and (2) unaccessed and pending based at least in part upon the organization component 120.

Figure 2:
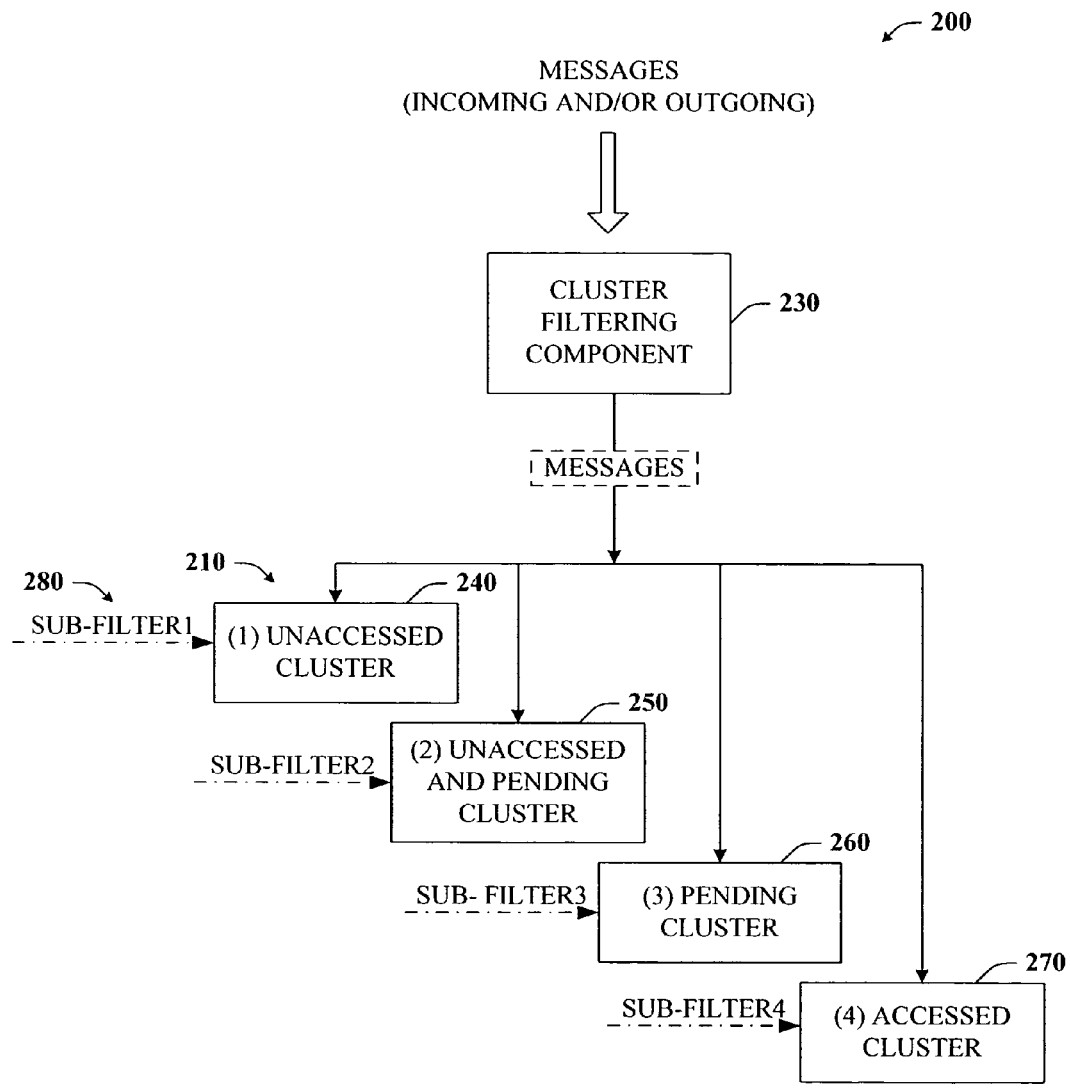
FIG. 2 is schematic block diagram of a system that facilitates prioritizing and viewing messages in accordance with an aspect of the present invention.

Referring now to FIG. 2, there is illustrated a schematic block diagram of a system 200 that organizes messages into various clusters 210, thereby facilitating viewing and managing content. In particular, incoming and/or outgoing messages can be organized together such that their relationship between one another can be maintained and/or visualized. For example, imagine the messages comprise various conversations held between the user and several different people. In order to properly visualize and organize the respective related messages, the system 200 can apply its functionalities to both them. As a result, clusters can include both sent and received messages so that continuity of context is maintained.

According to FIG. 2, a plurality of messages (e.g., at least one) is received into a cluster filtering component 230. The cluster filtering component 230 can be trained by factory-installed rules to have default settings such as all new messages go to an unaccessed cluster 240, for example. However, the cluster filtering component 230 can also be trained by way of user input. The user input can include explicit user configurations and/or be based in part upon implicit user behavior. For example, the filter can be trained to route messages (or copies thereof) originating from a user's manager into an unaccessed and pending cluster 250. By automatically routing messages based in part on the sender, the system 200 can readily indicate to the user that these messages require some type of action or response perhaps more immediately than other messages only located in the unaccessed cluster 240. Hence, the cluster filtering component 230 can include both a default set of rules as well as user-defined rules or preferences. In some instances, the user-defined rules can either augment the default set of rules or override them.

To allow any one message to serve multiple purposes or be utilized in more than one activity, any one message can exist in more than one cluster 210 at a time. This can be accomplished in part by routing a copy of the message into additional clusters 210 as desired or appropriate according to the cluster filtering component 230. In practice, the user can be provided an option to move either the original message or a copy of the message to another cluster.

When handling many projects, tasks, or messages which can require action, response, and/or follow-up at more than one time or by more than one person, being able to track the state (e.g., pending or not) of the message as well as any related messages can be very helpful to the user. Thus, the clusters 210 can be organized into a specific hierarchal order to allow users to flow effortlessly between determining what action to take in response to a message, managing messages, and retrieving messages.

For instance, the unaccessed cluster 240 can come first to support a user's initial activity when opening messages—determining what action, if any, to take in response to the message. A pending cluster 260 can come third. This is because it can be helpful to keep any reminders of pending actions in view to mitigate neglecting or forgetting about them if they were hidden from the user's sight. The unaccessed and pending cluster 250 can come second since it includes aspects of each of the unaccessed cluster 240 and the pending cluster 260. Finally, an accessed cluster 270 can come fourth because it can potentially comprise the highest quantity of messages but be needed the least amount by the user.

To further optimize visualization of the clustered content, sub-filters 280 can be employed in connection with each respective cluster 210. As shown in FIG. 2, the clusters 210 can be operatively connected to or comprise a particular filter that has been trained via user preferences, for example. In one instance, content or messages as discussed herein can be organized within each cluster according to any one or more of the following types of user preferences: priority (e.g., importance level), utility (e.g., value or usefulness to the user), cost (e.g., some value to the user), author (e.g., originator's name or email address), genre (e.g., type of content or message; subject matter of content), time criticality (e.g., due date), age (e.g., when received initially; when received into cluster), context (e.g., subject matter), size (e.g., of content or message), user state (e.g., offline, online, active, inactive, away, etc.), account through which message was received (e.g., work email account or personal email account), type of message (e.g., email, instant message, document, etc.), and/or rendering device (e.g., of content sender since physical limitations can be introduced based upon the device being employed by the content sender and/or user).

In another instance, each cluster 210 can include sub-groupings such as "pending-active" and "pending-inactive", for example, which means that the pending cluster 260 comprises two sub-groups of content: active and inactive. Hence, within each sub-group, messages can be ranked or ordered according to any one or more of the above user preferences. Moreover, the ordering of the clusters as well as the prioritization of the messages included therein facilitates an improved visualization of a plurality of messages in the user's message store.

Finally, as the user transitions from one state to another, the content or at least a portion thereof can be dynamically organized to accommodate for the user's present or new state. For example, imagine that the user's state is active and is in the middle of participating in an online conversation. Certain messages relevant to the online conversation can be prioritized in an active sub-group of the pending cluster 260 which can indicate that the user is acting on them in some manner at the present time. However, when the user leaves the conversation, he can appear offline and/or inactive. Thus, those messages in the active sub-group can be re-organized and dynamically moved to an inactive sub-group of the pending cluster 260 as a result of or in response to the user's change of state.

Figure 3:
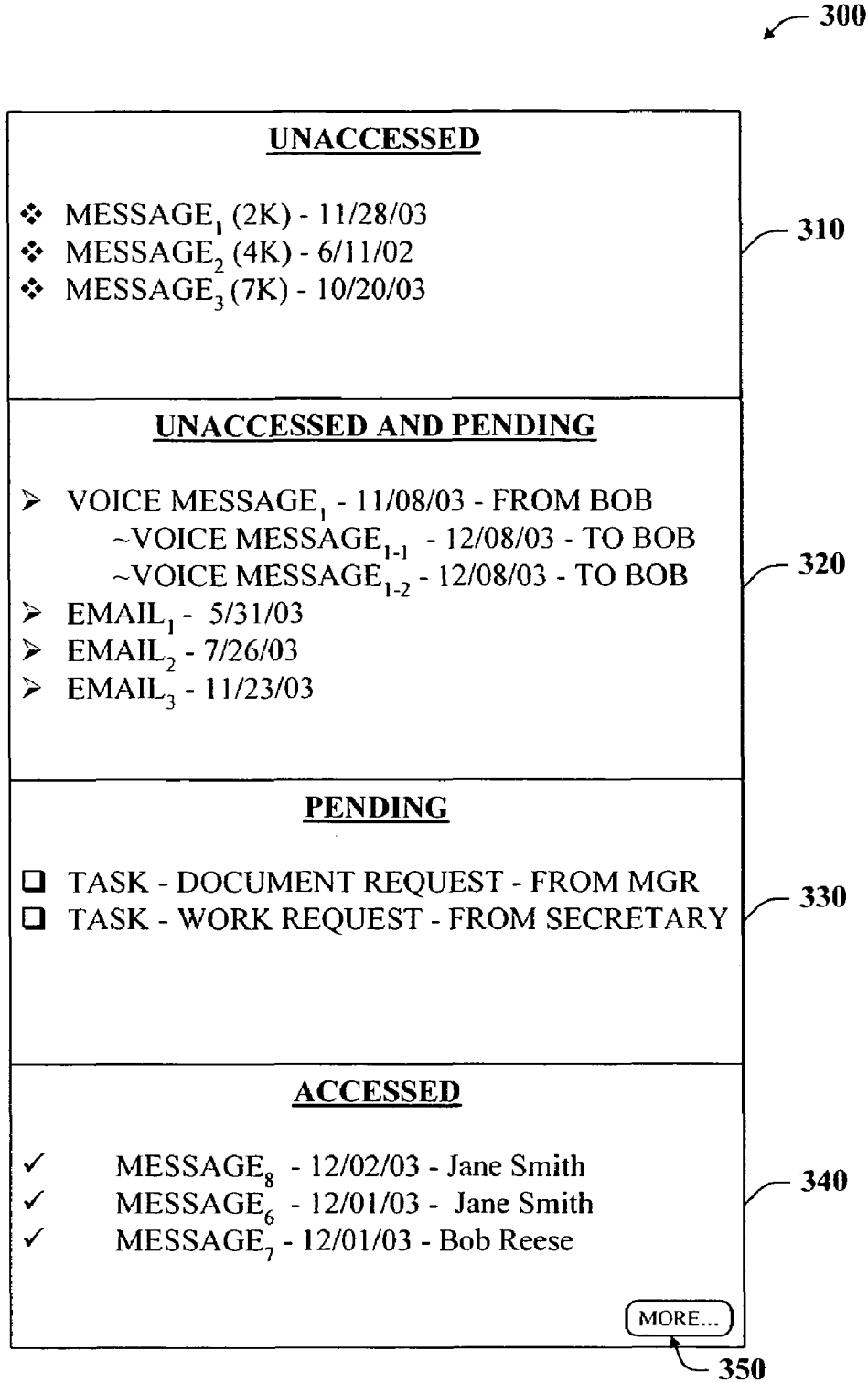
FIG. 3 is an exemplary user interface in accordance with an aspect of the present invention.

Referring now to FIG. 3, there is illustrated an exemplary user-interface 300 that facilitates visualizing and managing large volumes of content including but not limited to voice or written messages, emails, and tasks. As can be seen, at least four clusters are depicted in the following hierarchal order: unaccessed 310, unaccessed and pending 320, pending 330, and accessed 340. Each cluster can be identified by their respective name and appear as a header within each respective cluster, for example. However, the cluster names can be positioned as otherwise desired to appropriately and easily identify the respective clusters. Within each particular cluster, the messages can be further prioritized according to a date of receipt, author or sender, message size, and/or message type.

For example, the messages in the unaccessed cluster 310 have been arranged in ascending order with respect to the message size. Messages in the unaccessed and pending cluster 320 have been organized according to message type: voice message and email. In addition, messages of the email type have been further listed in ascending order with respect to a date of receipt. The date of receipt can be either the date the message was originally received by the user or the date on which the message was routed to the particular cluster. Both dates can be included since both can useful to the user depending on what action is needed in response to the message. The pending cluster 330 comprises task related messages that have been arranged according to sender—that is, tasks from the user's manager are ranked higher than tasks from the user's secretary. Finally, the accessed cluster 340 includes messages that have been arranged according to the date of receipt as well as according to the sender of the message.

Any one of the clusters can also include a "more" button 350 to indicate that additional messages are available for viewing but are out of view at the current time. This can be particularly useful for the accessed cluster 340 since it will likely hold a larger volume of messages at any one time than the other clusters. Since the user can determine the number of messages to view at a time for each cluster or in total, the more button 350 can serve as a reminder to the user that other messages are also present in the cluster.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 4:
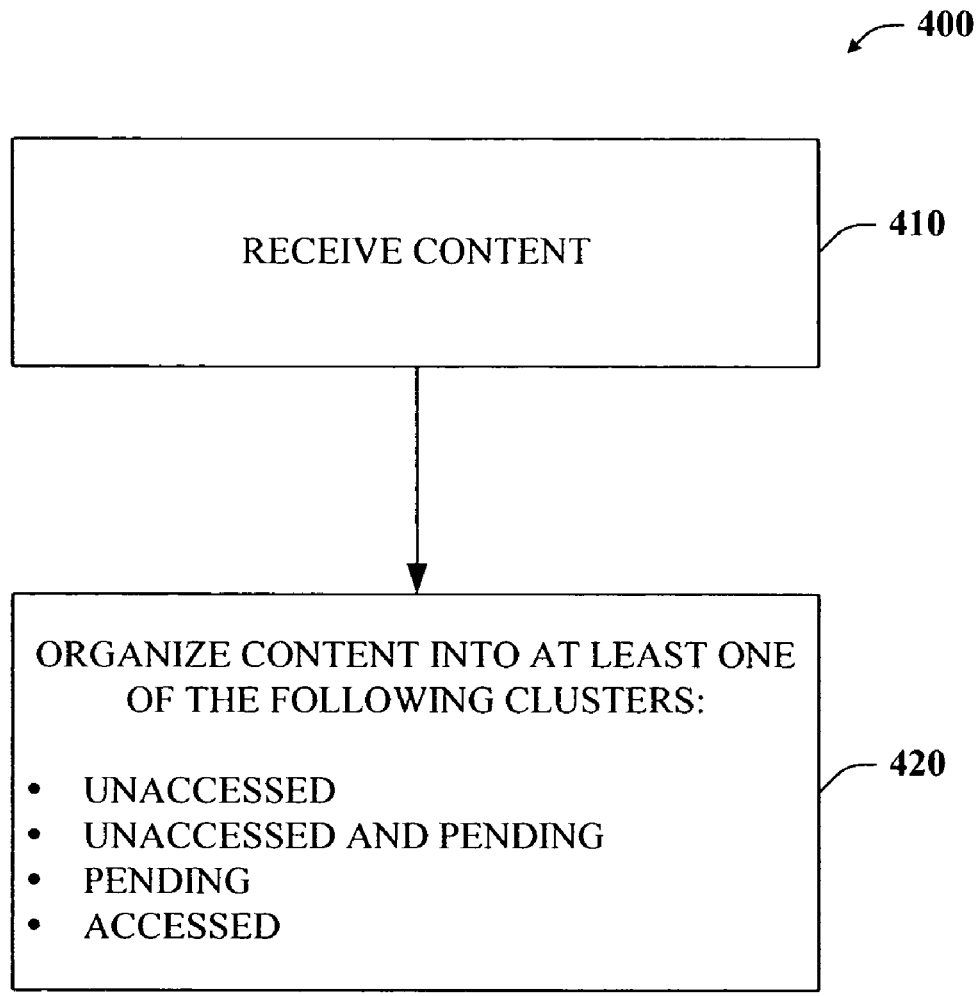
FIG. 4 is a flow diagram of an exemplary process that facilitates organizing and viewing messages in accordance with an aspect of the present invention.

Turning now to FIG. 4, there is illustrated a flow diagram of an exemplary method 400 that facilitates visualizing and managing potentially large volumes of content or messages in accordance with the present invention. The method 400 involves receiving content at 410. The content can be any type of message or communication between a sender and a user. The content is received and then organized into and/or made available to at least one of the following clusters: unaccessed, unaccessed and pending, pending, and/or accessed at 420. The clusters can be ordered as such or in any other manner that is conducive to optimizing management of the content.

Moreover, the content can be included in more than one cluster, whereby the user can select to transfer a copy of the content to one or more additional clusters. In addition, a filtering component can be employed to automatically transfer the content to one or more appropriate clusters based in part upon the filter parameters. Filter parameters can be trained and/or customized by users as needed or desired. At the cluster-level, the content can be further organized according to user preferences and/or sub-groupings within each cluster, as desired by the user. The resulting user-interface provides an improved visualization of substantially all content that may require the user's attention and mitigates hiding certain content of potential importance from the user's view.

Figure 5:
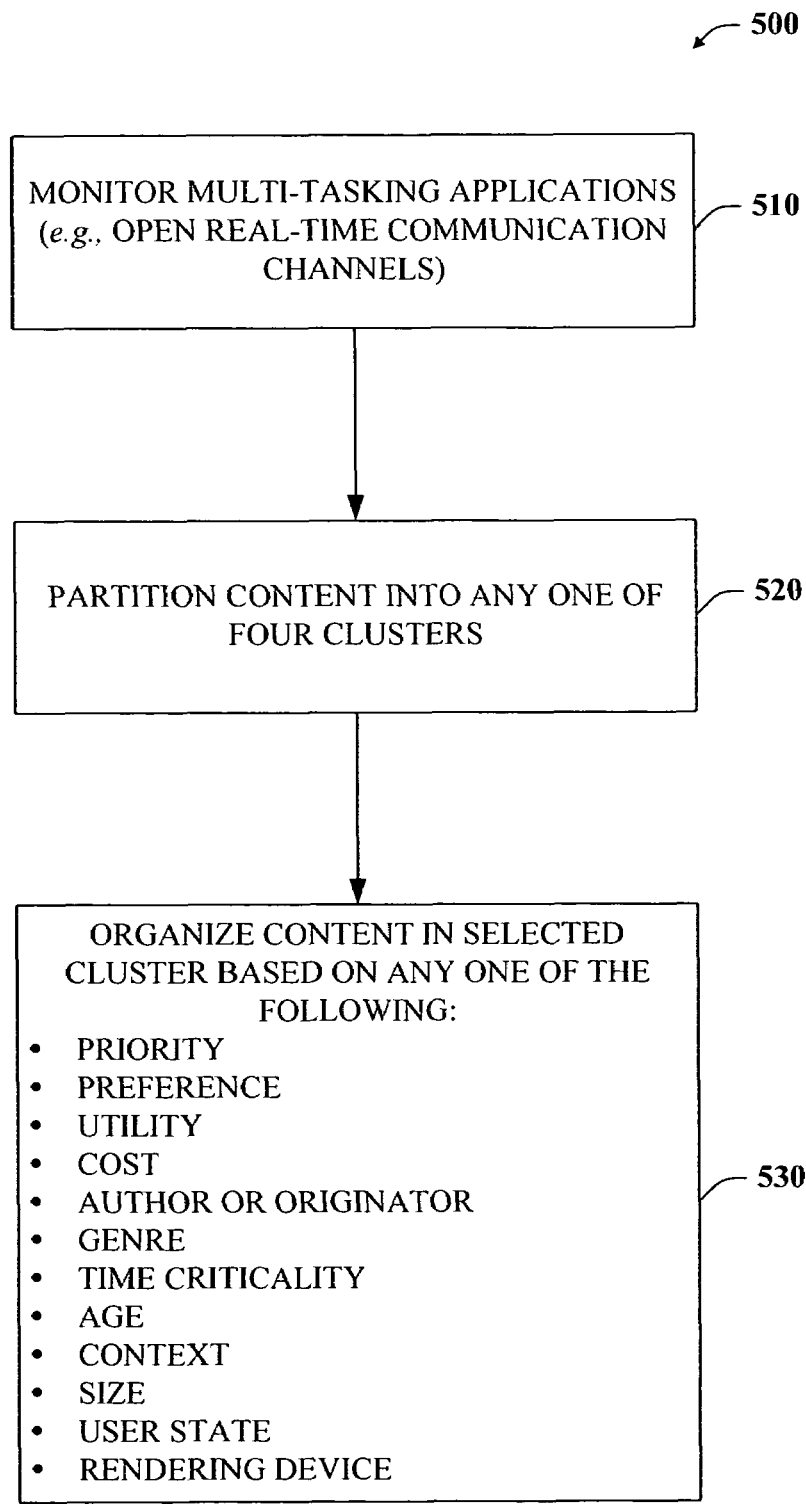
FIG. 5 is a flow diagram of an exemplary process that facilitates organizing and prioritizing more than one user or computer application in progress in accordance with an aspect of the present invention.

Referring now to FIG. 5, there is illustrated a flow diagram of an exemplary method 500 that facilitates managing a user's current applications while in a multi-tasking mode in accordance with the present invention. The method 500 involves monitoring or receiving input. The input can include identification of any computer-based applications a user is currently active or participating in at 510. For example, imagine a user has multiple real-time communication channels engaged such as a video conference, an online chat, an online phone conversation, as well as instant messaging. The subject content can be partitioned or organized at 520 into any one or more of the four clusters as discussed, supra, with respect to FIG. 4.

At 530, the computer-based applications can be further arranged within each respective cluster based at least in part upon one or more of the following user preferences: priority; utility; cost; author or originator; genre; time criticality; age; context; size; user state; and/or rendering device.

Still referencing the previous example, the user's involvement in the real-time communications channels can be ordered or prioritized for the user. For instance, a video conference can be given a highest priority due to the bandwidth resources it requires, whereas the online chat and instant messaging can be ranked lower than the other two for the same reason. Furthermore, some amount of time delay when exchanging communications via chat or instant message can be more acceptable due to their respective formats. However, in a live conversation (e.g., online phone) or video feed, delay or the user's inattention can be more noticeable and embarrassing.

In addition, the participants in these communications can be indicative of their ordering of priority. For example, a meeting with the client and the user's supervisor can take precedence (e.g., higher priority) over an online conversation with an old college friend, since one is work-related and the other is not.

The same type of ordering can be applied to other computer-based applications, particularly when the user is participating in each of the applications at about the same time. This can assist the user in visually and readily managing his different projects without losing sight of any one of them.

Figure 6:
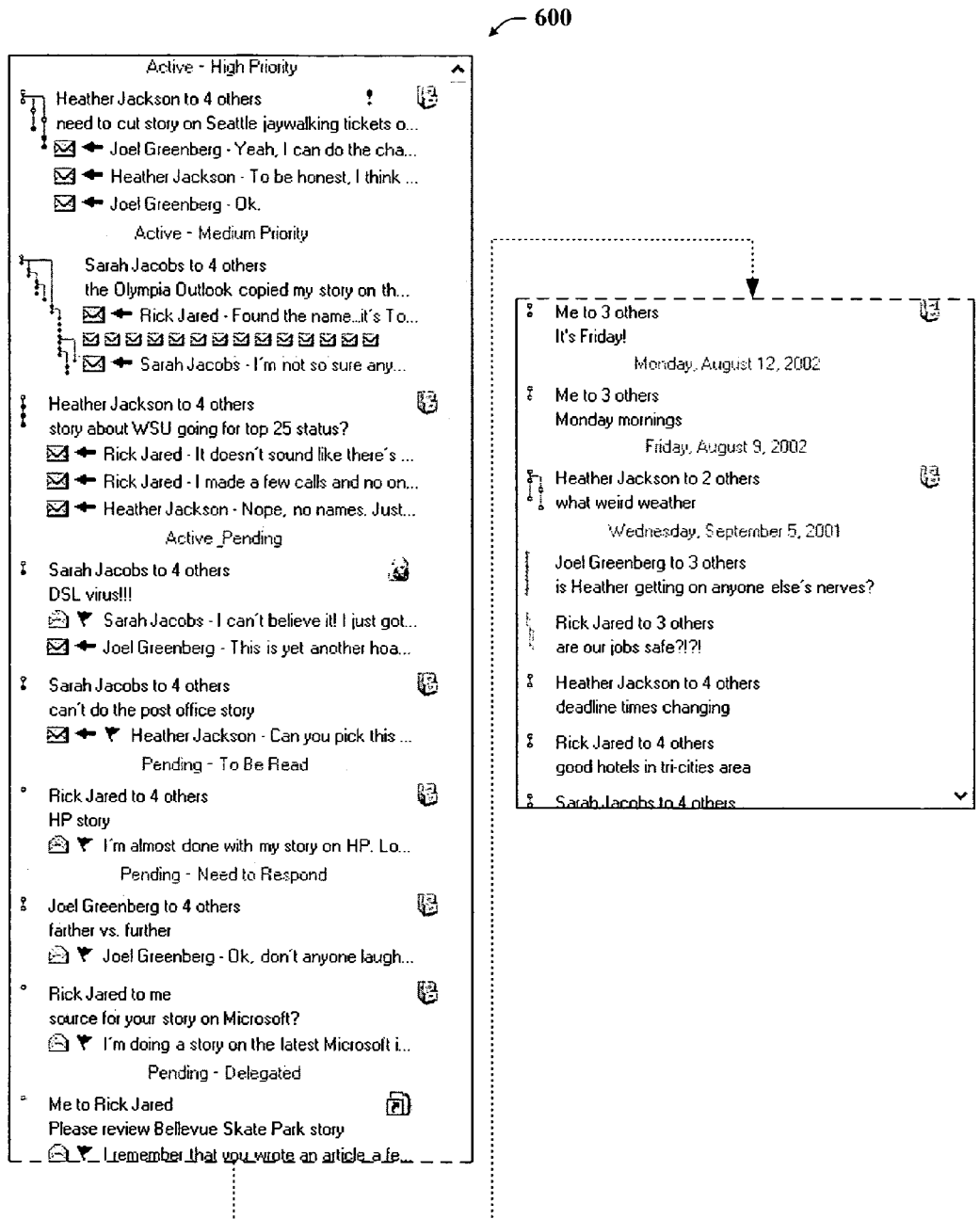
FIG. 6 is a screen capture image of an exemplary user interface in accordance with an aspect of the present invention.

Turning now to FIG. 6, there is illustrated a screen shot of an exemplary user interface 600 demonstrating aspects of the systems and methods described hereinabove in accordance with the subject invention. The user interface 600 features at least two clusters entitled Active and Pending, respectively. The Active cluster also includes priority sub-groupings such as Active-High Priority, Active-Medium Priority and Active-Pending. Similarly, the Pending cluster includes sub-groupings such as Pending-To Be Read, Pending-Need to Respond and Pending-Delegated which indicate the current state of the corresponding content.

The content organized in the user interface 600 as depicted in FIG. 6 comprises a plurality of conversations between a user and at least one other person. For example, in the Active-High Priority cluster, a conversation initiated by Heather Jackson to 4 others and at least a portion of her message to the 4 others is included. At least 3 messages either in response to Heather's initial message or to subsequent replies to the initial messages are also listed as a sub-group of the initial message. That is, Joel Greenberg replied to Heather's initial message. Subsequently, Heather replied to him and then Joel replied again. All of these messages relate back to the initial message and thus can be organized accordingly.

Furthermore, at least a portion of a person's message can be visualized to serve as a frame of reference to the user. For example, Heather's initial message includes the following text: "need to cut story on Seattle jaywalking tickets o . . . " such as either in a subject line or in the body of the message. Joel's response can include "Yeah, I can do the cha . . . ." These short snippets of each message can operate as brief reminders regarding the context or content of the particular message. Alternatively, some messages maybe condensed or appear as "closed" or unaccessed depending on the size limitations of the viewing window. Messages that appear condensed, "closed", and/or unaccessed can be based in part upon user preferences. For example, personal messages can be handled in this manner whereas work-related messages can be viewed with some context. In addition, messages from particular senders can be designated to appear with some context as well.

Other visual indicators can be employed to facilitate identifying higher priority and/or sensitive messages for the user.

For example, flags as well as exclamation points of various colors can be utilized by the user and applied to particular messages selected by the user.

Additional clusters can be included in their respective positions to maintain a flow of messages along a time continuum such as unaccessed to unaccessed and pending to pending to accessed. Thus, the clusters can be given names which are different from or variations of the above as long as the visual flow between clusters is maintained. For example, in the user interface 600, the clusters begin at Active to Pending and then to specific dates in the past. As can be seen, the visual flow of triaging messages, managing tasks, and retrieving older messages is exemplified.

Figure 7:
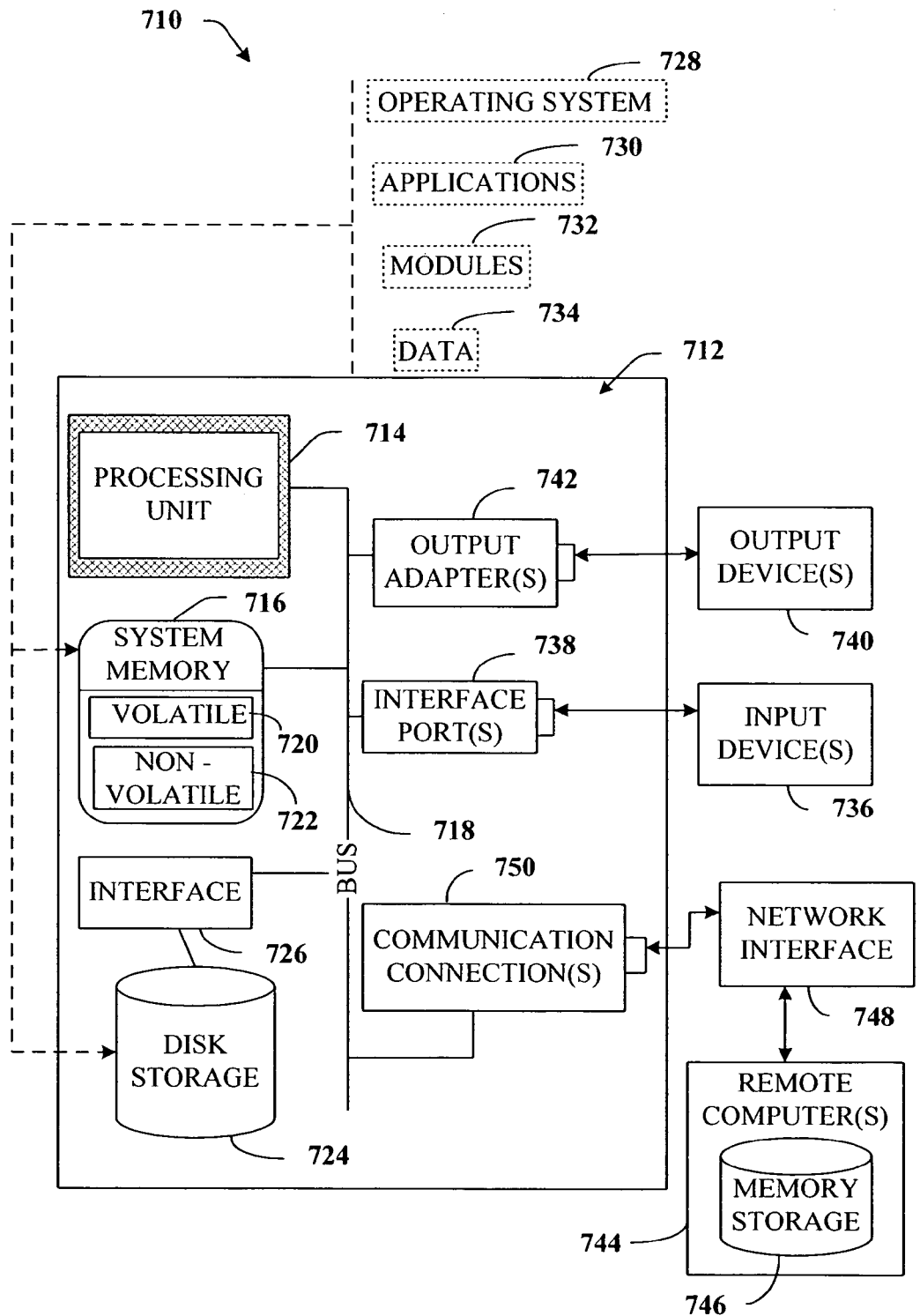
FIG. 7 is an exemplary environment for implementing various aspects of the invention.

In order to provide additional context for various aspects of the present invention, FIG. 7 and the following discussion are intended to provide a brief, general description of a suitable operating environment 710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples the system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example, a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712 and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates message content management, comprising:
    a display;
    a component that receives a first message and a second message for a user;
    a two-way communication channel in which a user is selectively active with a first participant; and
    an organization component that detects a first real-time communication between the first participant and the user, that determines an active characteristic of the received first message in response to associating the first participant with the first message, that determines the second message to be inactive, and that dynamically organizes the first message determined to be active in a prominently displayed cluster and dynamically organizing the second message in a less prominently displayed cluster on the display device.

2. The computer implemented system of claim 1, wherein the dynamically organized clusters of messages are hierarchically displayed in the following order: (1) unaccessed, (2) unaccessed and pending, (3) pending, and (4) accessed.

3. The computer implemented system of claim 1, the messages comprising text messages.

4. The computer implemented system of claim 1, the messages comprising media.

5. The computer implemented system of claim 1, the messages comprising computer-based applications.

6. The computer implemented system of claim 1, wherein the organization component further determines a priority characteristic of the received message, the message within a cluster is organized based at least in part on priority.

7. The computer implemented system of claim 1, wherein the organization component further determines a characteristic of the received messages and references a user preference associated with the characteristic, the messages within a cluster is organized based at least in part on user preference.

8. The computer implemented system of claim 1, wherein the organization component further determines a utility characteristic of the received message, the messages within a cluster is organized based at least in part on utility.

9. The computer implemented system of claim 1, wherein the organization component further determines a cost characteristic of the received message, the messages within a cluster is organized based at least in part on cost.

10. The computer implemented system of claim 1, wherein the organization component further determines an author characteristic of the received message, the messages within a cluster is organized based at least in part on at least one author of the content.

11. The computer implemented system of claim 1, wherein the organization component further determines a genre characteristic of the received message, the messages within a cluster is organized based at least in part on genre.

12. The computer implemented system of claim 1, wherein the organization component further determines a time criticality characteristic of the received message, the messages within a cluster is organized based at least in part on time criticality.

13. The computer implemented system of claim 1, wherein the organization component further determines an age characteristic of the received message, the messages within a cluster is organized based at least in part on age.

14. The computer implemented system of claim 1, wherein the organization component further determines a context characteristic of the received message, the messages within a cluster is organized based at least in part on context.

15. The computer implemented system of claim 1, wherein the organization component further determines a plurality of characteristic of the received message, references a user preference associated with each of the plurality of characteristics, the clusters employ one or more visual indicators to differentiate among at least two types of user preferences.

16. The computer implemented system of claim 1, wherein the organization component further determines a size characteristic of the received message, the messages within a cluster is organized based at least in part on size.

17. The computer implemented system of claim 1, wherein the organization component further determines a rendering device characteristic of the received message, the messages within a cluster is organized based at least in part on a rendering device of the sender.

18. The computer implemented system of claim 1, further comprising a cluster filtering component operatively connected between the receiving component and the organization component comprising one or more filters that directs messages to at least one of the four clusters based at least in part upon user preferences.

19. The computer implemented system of claim 18, the cluster filtering component is trained using at least one of explicit user input or implicit user behavior.

20. The computer implemented system of claim 1, at one of the four clusters comprises at least one sub-filter that facilitates organizing messages within any one of the clusters.

21. The computer implemented system of claim 1, the communication channel comprising a video conference.

22. The computer implemented system of claim 1, the communication channel comprising an online chat.

23. The computer implemented system of claim 1, the communication channel comprising a telephone call.

24. The computer implemented system of claim 1, the communication channel comprising an instant messaging session.

25. A computer implemented method that facilitates message content management comprising:
- receiving a first message and a second message for a user;
- detecting a first real-time communication between a first participant and the user;
- determining an active characteristic of the received first message in response to associating the first participant with the first message and determining the second message to be inactive; and
- dynamically organizing first message determined to be active in a prominently displayed cluster and dynamically organizing the second message in a less prominently displayed cluster on a display.

26. The computer implemented method of claim 25, further comprising employing one or more filters to organize at least a portion of the messages as part of at least one of the clusters.

27. The computer implemented method of claim 25, the messages comprises text messages.

28. The computer implemented method of claim 25, the messages comprises computer-based applications.

29. The computer implemented method of claim 25, further comprising determining characteristics of and ordering the messages within any one cluster based at least in part upon one of the following: priority, user preference, utility, cost, author, genre, time sensitivity, age, size, or user state.

30. The computer implemented method of claim 25, further comprising adding more than one visual indicators to at least one cluster to facilitate messages viewing and management.

31. The method of claim 25, further comprising making messages or a copy thereof available for arrangement into more than one cluster.

32. The computer-implemented method of claim 25, further comprising dynamically-organizing each message into at least one of the following clusters: (1) unaccessed content, (2) unaccessed and pending content, (3) pending content, and (4) accessed content.

33. The computer implemented method of claim 32, the clusters of messages are hierarchically displayed in the following order: (1) unaccessed, (2) unaccessed and pending, (3) pending, and (4) accessed.

34. The computer implemented method of claim 25, further comprising:
- characterizing a priority for a user response to the first and second messages; and
- dynamically organizing the first and second messages in a cluster based upon the priority for varying prominence of display.

35. The computer implemented method of claim 25, further comprising:
- detecting a second real-time communication between a second participant and the user characterized by a greater communication lag than the first real-time communication; and
- determining an active characteristic of the received second message in response to associating the second participant with the message content of the second message; and
- dynamically organizing the second message in a cluster of less priority than the first message and more priority than an inactive message.

36. The computer implemented method of claim 35, further comprising:
- detecting the first real-time communication as an audible conversation between the first participant and the user; and
- detecting the second real-time communication as a text conversation between the second participant and the user.

37. The computer-implemented method of claim 36, further comprising detecting the first real-time communication as an audiovisual conversation between the first participant and the user.

38. The computer-implemented method of claim 25, further comprising:
- detecting a second real-time communication between a second participant and the user characterized by a lower priority of communication than the detected first real-time communication; and
- determining an active characteristic of the received second message in response to associating the second participant with the message content of the second message; and
- dynamically organizing the second message in a cluster of less priority than the first message and more priority than an inactive message.

39. The computer-implemented method of claim 38, further comprising determining a higher priority of communication for the first message by associating with a work category and a lower priority of communication for the second message by associating with a personal category.

40. A computer-readable storage medium having stored thereon the following computer executable components:
- a component that receives first message and a second message for a user;
- a component that detects a first real-time communication between a first participant and the user;
- a component that determines an active characteristic of the received first message in response to associating the first participant with the first message and determining the second message to be inactive; and
- an organization component that dynamically organizes the first message determined to be active in a prominently displayed cluster and dynamically organizes the second message in a less prominently displayed cluster on a display.

41. A computer implemented system that facilitates message content management comprising:
- a means for interfacing with a user;
- means for receiving a first message and a second message for a user;
- means for detecting a first real-time communication between a first participant and the user;
- means for determining an active characteristic of the received first message in response to associating the first participant with the first message and determining the second message to be inactive; and
- means for dynamically organizing the first message determined to be active in a prominently displayed cluster and dynamically organizing the second message in a less prominently displayed cluster on a display.

42. The computer-implemented system of claim 41, further comprising means for dynamically organizing each message into at least one cluster of the following clusters: (1) unaccessed content, (2) unaccessed and pending content, (3) pending content, and (4) accessed content.

* * * * *